United States Patent [19]
Chan et al.

[11] Patent Number: 5,111,302
[45] Date of Patent: May 5, 1992

[54] METHOD AND SYSTEM FOR ENHANCING THE QUALITY OF BOTH COLOR AND BLACK AND WHITE IMAGES PRODUCED BY INK JET AND ELECTROPHOTOGRAPHIC PRINTERS

[75] Inventors: C. S. Chan; James G. Bearss; Terry M. Nelson, all of Boise, Id.

[73] Assignee: Hewlett-Packard Company, Palo Alto, Calif.

[21] Appl. No.: 515,946

[22] Filed: Apr. 27, 1990

Related U.S. Application Data

[63] Continuation-in-part of Ser. No. 278,881, Dec. 2, 1988, Pat. No. 4,930,018.

[51] Int. Cl.⁵ .................. H04N 1/034; H04N 1/29; B41J 2/205; B41J 2/21
[52] U.S. Cl. .................. 358/298; 358/75; 358/300; 358/459; 346/1.1; 346/140 R
[58] Field of Search .................. 358/75, 80, 296, 298, 358/300, 456, 459; 346/140 R, 1.1, 153.1, 157, 160; 355/239

[56] References Cited

U.S. PATENT DOCUMENTS

| | | | |
|---|---|---|---|
| 4,595,948 | 6/1986 | Itoh et al. | 358/75 |
| 4,638,372 | 1/1987 | Leng et al. | 358/296 |
| 4,672,432 | 6/1987 | Sakurada et al. | 358/75 |
| 4,680,645 | 7/1987 | Dispoto et al. | 358/298 |
| 4,746,935 | 5/1988 | Allen | 346/140 R |
| 4,930,018 | 5/1990 | Chan et al. | 346/140 P D |
| 5,012,257 | 4/1991 | Lowe | 346/140 R |

OTHER PUBLICATIONS

Byte Magazine, "Introduction to Image Processing Algorithms" by Dawson, p. 169 et. seq.
"Designer's Guide to Roster Image Printer Algorithms," by Dispoto et al., 1st Edition, Dec. 1986, Hewlett Packard.
Proceedings of the Society of Information Display, vol. 17/2 entitled "An Adaptive Algorithm for Spatial Gray Scale".

Primary Examiner—Benjamin R. Fuller
Assistant Examiner—Scott A. Rogers

[57] ABSTRACT

A method of gray scale printing of dots of one or more colors into pixels and in a controlled ordered sequence into a plurality of super pixels defined by a given number of said pixels, characterized in that: one or more levels of dot loading are used to achieve different values of gray level in a multiple-level gray table. This generic method is applicable to both ink jet and electrophotographic printing species of this invention.

In one electrophotograpic printing species of this invention, there is disclosed a method of electrophotographic color printing which includes mixing a plurality of colors in a single plane and in dot-next-to-dot (DND) pixels within a plurality of super pixels to produce a color image, whereby the sum of the multi-color dots printed in any super pixel is limited to the number of subdivided individual pixels therein, thereby assuring dot-next-to-dot (DND) always printing of said colors in a single plane. The above method further includes varying the area of each printed color dot within each pixel of a super pixel in order to control the gray scale of a printed color image.

Gray scale printing is achieved by controlling the selection of a gray table entry level number representative of one of several available entry level numbers corresponding to a plurality of different dot loadings for a corresponding plurality of differently printed super pixels.

26 Claims, 12 Drawing Sheets

16 Levels Gray Table

Based on 2x2 super-pixel

*Define density (reflectance) ratio to be:*

$d1:d2:d3 = 4:2:1$

| LEVEL | 1/4 | 2/4 | 3/4 | 4/4 |
|---|---|---|---|---|
| 1 | (0,0,1) | | | |
| 2 | (0,1,0) | (0,0,2) | | |
| 3 | | (0,1,1) | (0,0,3) | |
| 4 | (1,0,0) | (0,2,0) | (0,1,2) | (0,0,4) |
| 5 | | (1,0,1) | (0,2,1) | |
| 6 | | (1,1,0) | (0,3,0) | |
| 7 | | | (1,1,1) | (1,0,3) |
| 8 | | (2,0,0) | (1,2,0) | (0,4,0) |
| 9 | | | (2,0,1) | (1,2,1) |
| 10 | | | (2,1,0) | (2,0,2) |
| 11 | | | | (2,1,1) |
| 12 | | | (3,0,0) | |
| 13 | | | | (3,0,1) |
| 14 | | | | (3,1,0) |
| 15 | | | | |
| 16 | | | | (4,0,0) |

Fig. 2A

32 Levels Gray Table

Based on 2x2 super-pixel

*Define density (reflectance) ratio to be:*

*$d1:d2:d3 = 8:3:1$*

| LEVEL | 1/4 | 2/4 | 3/4 | 4/4 |
|---|---|---|---|---|
| 1 | (0,0,1) | | | |
| 2 | | (0,0,2) | | |
| 3 | (0,1,0) | | (0,0,3) | |
| 4 | | (0,1,1) | | |
| 5 | | | (0,1,2) | |
| 6 | | (0,2,0) | | |
| 7 | | | (0,2,1) | |
| 8 | (1,0,0) | | | (0,2,2) |
| 9 | | (1,0,1) | | |
| 10 | | | (1,0,2) | |
| 11 | | (1,1,0) | | (1,0,3) |
| 12 | | | (1,1,1) | |
| 13 | | | | (1,1,2) |
| 14 | | | (1,2,0) | |
| 15 | | | | (1,2,1) |
| 16 | | (2,0,0) | | |
| 17 | | | (2,0,1) | |
| 18 | | | | (2,0,2) |
| 19 | | | (2,1,0) | |
| 20 | | | | (2,1,1) |
| 21 | | | | |
| 22 | | | | (2,2,0) |
| 23 | | | | |
| 24 | | | (3,0,0) | |
| 25 | | | | (3,0,1) |
| 26 | | | | |
| 27 | | | | (3,1,0) |
| 28 | | | | |
| 29 | | | | |
| 30 | | | | |
| 31 | | | | |
| 32 | | | | (4,0,0) |

Fig. 2B

Example of filling in the image plane

| Color<br>Dye Load | Black | Cyan | Magenta | Yellow |
|---|---|---|---|---|
| High | 76, 78, 80 (● ● / · ·) | 86, 84, 82 (· · / ● ●) | 88, 90 (● · / · ·) | 92 (· · / · ·) |
| Medium | 98, 94, 96 (· ● / · ●) | 102, 104, 100 (● · / ● ·) | 106 (· · / · ·) | 108, 110 (· ● / · ·) |
| Low | 112 (· · / · ·) | 114 (· · / · ·) | 120, 118, 116 (· · / ● ●) | 122 (· · / · ·) |

Example

|  | High | Medium | Low |
|---|---|---|---|
| K = ( | 2, | 2, | 0 ) |
| C = ( | 2, | 2, | 0 ) |
| M = ( | 1, | 0, | 2 ) |
| Y = ( | 0, | 1, | 0 ) |

Fig. 4

0-4 GRAY LEVEL

Level 0  156

Level 1  158

Level 2  160

Level 3  162

Level 4  164

| Color<br>Dot Size | Black | Cyan | Magenta | Yellow |
|---|---|---|---|---|
| Large |  | 204 (C) |  |  |
| Medium | 206 (K) |  | 210 (M) 208 (M) |  |
| Small |  |  |  |  |

|  | High | Medium | Low |
|---|---|---|---|
| K = ( | 0, | 1, | 0 ) |
| C = ( | 1, | 0, | 0 ) |
| M = ( | 0, | 2, | 0 ) |
| Y = ( | 0, | 0, | 0 ) |

*Fig. 5D*

METHOD AND SYSTEM FOR ENHANCING THE QUALITY OF BOTH COLOR AND BLACK AND WHITE IMAGES PRODUCED BY INK JET AND ELECTROPHOTOGRAPHIC PRINTERS

RELATED APPLICATION

This application is a continuation-in-part of U.S. application Ser. No. 278,881 filed Dec. 2, 1988, U.S. Pat. No. 4,930,018.

TECHNICAL FIELD

This invention relates generally to the recording of color and black and white images using digital image processing techniques. More particularly, the invention is directed to a method and system for improving the quality of such images using state-of-the-art ink jet and laser (electrophotographic) printers and gray scale or halftoning techniques.

BACKGROUND ART

For several years now, it has been known to convert both color and black and white images scanned using a variety of image sensors to an output ink recording of various types of printers, such as ink jet printers. One example of such an image conversion system is disclosed in U.S. Pat. No. 4,672,432 assigned to Canon of Japan, and this system is capable of converting red, blue and green colors of a picture taken by a scanner into cyan, yellow and magenta color outputs from an ink jet printer. The subject matter of this U.S. patent is incorporated herein by reference.

More recently, significant developments have been made in the art of thermal ink jet color printing. An example of one such development was the introduction by the present assignee, Hewlett-Packard Company, in 1987 of its multicolor thermal ink jet printer sold under the trademark "PaintJet". This printer is described in detail in the *Hewlett-Packard Journal*, Vol. 39, No. 4 published in August 1988 and incorporated herein by reference. Other newly available color ink jet printers have been recently described in numerous trade journals, and an example of such publication is an article in *Personal Computing* magazine by W. L. Rosch entitled "New Printers Banish Black and White", May 31, 1988, at page 168 et seq.

While these color ink jet printers have been generally well received and operate satisfactorily in most respects, some of the images recorded by these printers have exhibited a certain undesirable color contrast or "grainyness" which detracts from the quality of the recorded image. There are two ways of reducing this "grainyness" or undesirable color contrast, and one way involves using a higher dots per inch (dpi) resolution whereas the other way involves the use of gray scale techniques. The present invention falls into the latter category.

DISCLOSURE OF INVENTION

Accordingly, it is an object of the present invention to provide a new and improved method and system which is operative to reduce such undesirable color contrast and grainyness of images recorded by ink jet printers, thereby improving the quality of such recorded images.

Another object of this invention is to provide a new and improved method of electrophotographic or laser printing wherein improved color mixing is achieved by the use of dot-next-to-dot (DND) formatting. Both the laser printing and ink jet printing species of this invention are within the scope of the generic claims appended hereto.

Another object is to provide a new and improved method and system of the type described which achieves such improved image quality without any sacrifice in resolution and without using higher resolutions. The disadvantage of going to higher resolutions is that it results in slower print times, requires more nozzles and requires operating the nozzles at a higher print frequency in the field of ink jet printing.

Another object is to provide a new and improved method and system of the type described which is readily and economically adaptable for use with state-of-the-art thermal ink jet and laser printers without requiring an increase in the dot printing density of these printers.

A further object of this invention is to provide a new and improved method and system of the type described which is operative to minimize the amount of paper cockleing produced during ink jet printing.

A feature of this invention is the provision of a unique error diffusion and pixel assignment gray scaling stage for a color image conversion-to-hardcopy output electronic system. This gray scaling stage includes, among other things, means for controlling the ejection of ink onto a print medium in a pixel address sequence controlled by the value of gray scale numbers to which said image information is assigned.

Another feature of this invention is the ability to apply the gray scaling techniques described herein to the field of electrophotography and more particularly to the field of laser printing. The subject of electrophotography has been described in several publications including a book entitled *Electrophotography* by R. M. Schaffert, Focal Press, London, Copyright 1975 (5th Impression 1980) and also in a book entitled *Electrophotography and Development Physics* by Laurence B. Schein, IBM Research Division, Springer Series in Electrophysics, Vol. 14, Springer-Verlag Press, Germany, October 1987. Both of these texts are incorporated herein by reference.

Another feature of this image conversion system according to the present invention is its ability to match an ink loaded drop to a selected print area for receiving the drop in a manner to enhance print quality from an ink jet printing operation. This system includes means for scanning an image to generate digital data representative thereof, means connected to the scanning means for converting the digital data to gray scale digital information, and means connected to the converting means for processing the digital information in such a manner as to prevent the volume of the ink loaded drop from exceeding a preselected maximum allowable ink drop volume, $V_{max}$.

The above image conversion system also features means for generating cyan, yellow, magenta and black pixel information, means connected to receive the pixel information and for assigning the information a gray scale drop count number based upon a count of ink drops and the dye loading thereof, and means connected to the assigning means for decrementing the drop count number to a desired and selectable lower level number on the gray scale.

The above image conversion system also features means for printing sub-divided super pixels in response to scanning rows of black, cyan, magenta and colors of first a high dye loading, then a medium dye loading and finally a low dye loading. In this process, the ink printed in successively printed pixels is distributed over the printed media to assure maximum print quality and minimum color contrast.

Another feature of this invention is the provision of a laser or electrophotographic color image conversion process wherein deposited colorant per unit of laser printed area is used as the equivalent of dye loading per unit area in ink jet printing. In the field of laser printing, the equivalent of a "1", "2" and "4" dye loading is, respectively, to a first order approximation, a laser printed dot of one quarter (¼) dot area, one half (½) dot area and one (1) dot area, where in relative terms a "1" dot area in the field of laser printing is equivalent to a "4" dye loading in ink jet printing.

Another feature of this invention resides in the implementation of the above laser or electrophotographic printing using dot-next-to-dot (DND) formatting so that successively printed laser generated dots are never printed one on top of another in a given pixel area. This feature is particularly advantageous where non-transparent magnetic toners are used in laser printing and are sometimes operative to prevent the required color mixing from occurring if dot-on-dot (DOD) printing techniques are used. Thus, in the case of laser printing, the equivalent value of the ink volume, $V_{max}$, in ink jet printing will be equal to the number of individual pixel subdivisions within a super pixel. Using a 2×2 super pixel, the $V_{max}$ equivalent in the laser printing embodiment of this invention is equal to 4.

The generic claims of this application which are fully supported by both ink jet and electrophotographic embodiments of the invention are directed to a method of gray scale printing of dots of one or more colors in a controlled ordered sequence into a plurality of super pixels defined by a given number of said pixels. This method is further characterized in that one or more levels of dot loading are used to achieve different values of gray level in a multiple level gray table.

In the field of ink jet printing, the above objects and other features and advantages of this invention are accomplished by, among other things, providing a controlled ink drop count and corresponding selected dye loading for ejection into addressable pixels. These pixels are defined by a plurality of row and column locations in a chosen gray scale matrix. This drop count and corresponding dye loading are representative of digital gray scale information generated by scanning a chosen image, and this information is used to select the ink drop count and dye loadings used in an ink jet printer. Ink drop volumes of each drop count and dye loading are computed, and the sum of the measured ink drop volumes are compared with a predetermined maximum allowable ink drop volume ($V_{max}$) to be received by a selected print medium. Minimum paper cockleing will occur if the chosen ink drop volume does not exceed $V_{max}$ for a given area of print media. An ink volume difference or error signal is generated in response to such comparison, and this error signal is in turn used to select the optimum drop count and dye loading for minimum color contrast for each level of gray scale printed.

During ink jet printing, it is necessary to control $V_{max}$ for different kinds of print media and for different inks printed thereon in order to minimize paper cockleing. This is a condition where the paper expands or contracts unevenly and becomes rough and uneven where too much ink is received in certain area thereon. However, within this limitation of $V_{max}$, the present invention will operate to maximize the drop count number and thus maximize the number of drop counts within a given printed surface area, such as for example a 2×2 pixel. This feature in turn has the effect of minimizing color contrast in the printed image.

In a preferred thermal ink jet embodiment of the invention, we provide a novel method for minimizing color contrast in a printed image which includes generating cyan (C), yellow (Y), magenta (M) and black (K) pixel information and assigning this information a gray scale number based upon a count of ink drops and dye loading of the drops. Then, this assigned number is decremented to a selected lower digital number in the same level of gray scale or to a lower digital number in a lower level of gray scale in response to a measure of the number of ink drops and their dye loading representative of scanned C, Y, M and K information. The system and method according to the present invention further includes means for assigning each digit of the finally adjusted gray scale number to a selected pixel within a larger or super pixel. The particular pixel selection process is based upon the numerical value of the adjusted gray scale number.

The above objects, features, and generic claims directed to laser printing are accomplished by, among other things, varying an electrophotographically generated dot area within a pixel of a super pixel in order to achieve different values of gray level in a multiple-level gray table. Dot-next-to-dot formatting is used in all color planes so that the maximum number of dots printed in any super pixel is equal to the number of individual pixel sub-divisions therein.

The method herein of gray scale electrophotographic color printing also includes printing dots of one or more colors into a plurality of super pixels in a controlled ordered sequence including the steps of using one or more levels of dot loading in each of said pixels to achieve one or more values of gray level of a multiple level gray table, and using dot-next-to-dot (DND) formatting so that the number of dots printed in each super pixel never exceeds the number of individual or subdivided pixels therein.

There method herein of gray scale electrophotographic color printing is also defined by the steps of scanning an image to provide pixel information values of one or more colors within said image, providing a plurality of different gray scale entry level numbers representative of different available dot loadings within a corresponding plurality of different levels of a chosen gray table, establishing a predetermined maximum allowable dot loading which may be received within a given printed super pixel area, and selecting for printing a dot loading per super pixel which does not exceed said maximum allowable dot loading.

Various other advantages of this invention will become better understood from the following description of the accompanying drawings.

BRIEF DESCRIPTION OF THE DRAWINGS

FIG. 2A is a table of 16 levels of gray scale and is based upon the use of a two-by-two super pixel.

FIG. 2B is a table of 32 levels of gray scale and is also based upon the use of a two-by-two super pixel.

FIG. 4 is a matrix showing three rows and four columns of 2×2 super pixels to illustrate the assignment of ink drops to each pixel based upon the value of the digits in each assigned gray scale digital number.

FIG. 5D is a matrix showing three rows of four columns of 2×2 super pixels to illustrate the assignment of electrophotographically generated dots of different areas corresponding to the different levels of loading in the different color planes.

DESCRIPTION OF THE PREFERRED EMBODIMENT

Figure 1:
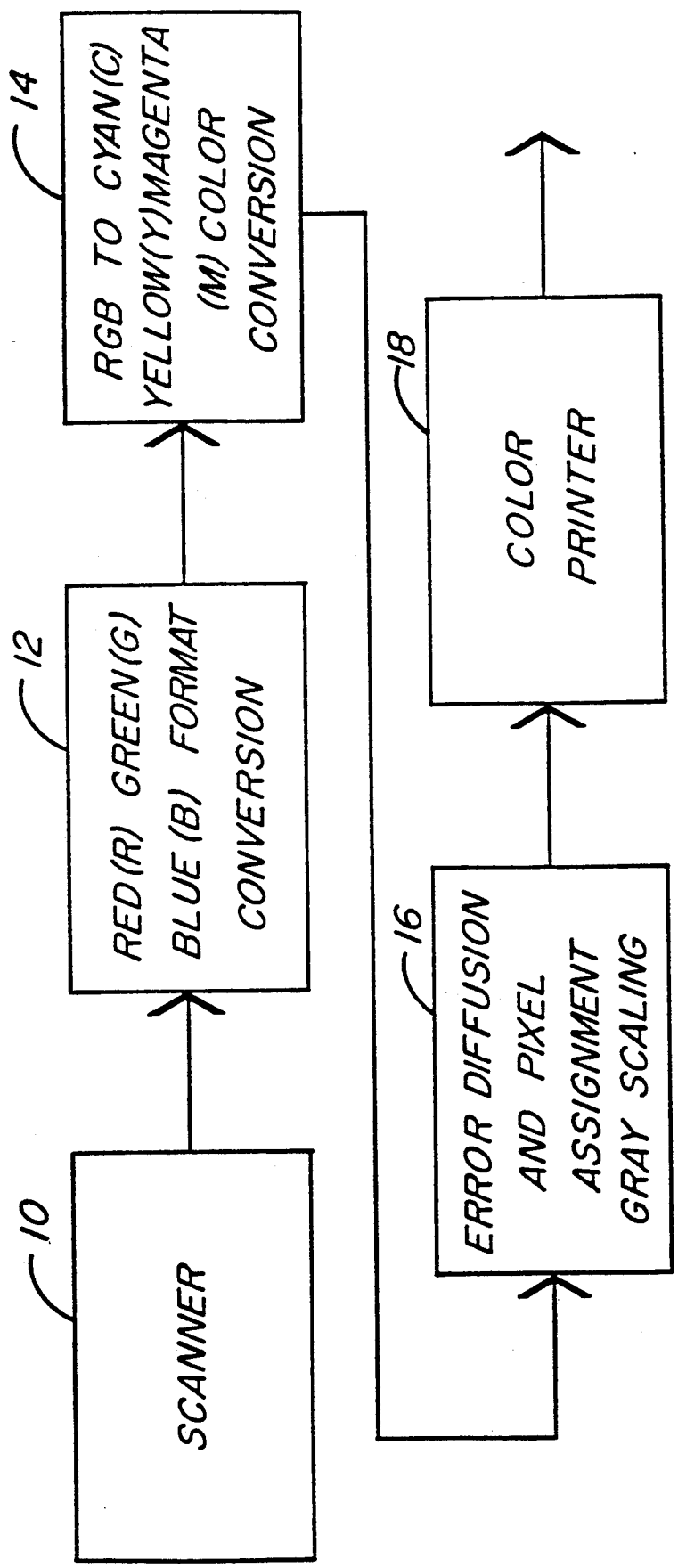
FIG. 1 is a functional block diagram of the image conversion system according to the present invention.

Referring now to FIG. 1, a scanner 10 may be used to convert a color image into digital gray scale data for application to an additive red-green-blue (R-G-B) format conversion stage 12. The R-G-B output data from the format conversion stage 12 is applied as indicated to the subtractive color primaries cyan-yellow-magenta (C-Y-M) color conversion stage in a well known manner and including 100% undercolor removal to obtain black. A chromatic color (black) cannot be easily made by mixing Y-M-C ink colors, and such mixing will increase the amount of ink consumed. Therefore, the black created by YMC colors is preferably replaced by pure black (K). This replacement and the generation of pure black is known in the art as undercolor correction or undercolor removal (UCR).

The use of 100% undercolor removal is for the purpose of minimizing ink consumption and to improve resolution. The equation for 100% UCR for colors C, M, Y and K is K=min (C, M, Y) where the new C=C-K, the new M=M-K and the new Y=Y-K.

The output of the C-Y-M color conversion stage 14 is a digital data stream which is applied to the error diffusion and pixel assignment stage 16, and the latter stage in turn drives a color printer 18, preferably a thermal ink jet color printer. The general functional arrangement of the image scanning and reproduction system of FIG. 1 is generally well known in the image processing art. The image processing operation and capability of such a system is described, for example, in the March 1987 issue of *BYTE* Magazine in an article by B. M. Dawson entitled "Introduction To Image Processing Algorithms" at page 169 et. seq. Such image processing capability and corresponding system operation is also described in a publication by Gary Dispoto et al entitled *Designer's Guide to Raster Image Printer Algorithms*, First Edition, December 1986, Copyrighted by and available from the Hewlett-Packard Company in Palo Alto, Calif. Both of these latter references are incorporated herein by reference.

The processes of error diffusion and pixel assignment in a gray scaling image processing operation are also generally well known in this art. Error diffusion is a technique used to disperse to the neighboring pixels the error between a printable gray scale and the input image data gray scale. This error diffusion has been frequently carried out using a selected one of many well known algorithms such as those discussed in the above identified Dawson article. As an example, this error diffusion may be carried out using either one of two well known algorithms in this art, namely, Floyd and Steinberg's 4-point algorithms and Stucke's 12-point algorithms.

In 1976, Robert W. Floyd and Lewis Steinberg published a paper in the *Proceedings of the Society of Information Display*, Vol. 17/2 entitled "An Adaptive Algorithm For Spacial Gray Scale", and in this article there is described an algorithm which is entitled "Error Diffusion". As indicated above and described in detail in the Floyd and Steinberg paper, error diffusion is a technique used to disperse the difference between the actual gray scale of the read pixel values and the subsequently assigned row and column (i,j) gray scale of a look-up gray table into the pixels which surround the assigned gray scale pixels. This error diffusion is done in such a manner as to minimize smearing of the image reproduced. The above Floyd and Steinberg paper is incorporated herein by reference.

Other similar error diffusion techniques which may be used in combination with the novel methods disclosed herein are described in copending application Ser. No. 484,713 of C. S. Chan filed Feb. 26, 1990, and also in U.S. Pat. No. 4,680,645 issued to Dispoto et al, both assigned to the present assignee and both incorporated herein by reference.

Referring now to FIG. 2, there is shown a 16 level gray table based upon a two-by-two super pixel and also based upon a high-medium-low dye loading for each 3 digit gray scale number and weighted as indicated in the reflectance density ratio of 4:2:1. Thus, the left hand digit of each gray scale number in each row and column of the 16 level gray table in FIG. 2 represents a high (H) dye loading, the middle digit of each 3-digit gray scale number represents the medium (M) dye loading and the right hand digit of each number represents a low (L) dye loading for each drop of ink ejected onto a pixel. Each of these H, M and L dye loadings is selected to give a 4:2:1 reflectance ratio on the printed page as will be understood by those skilled in the art.

The numbers 1, 2, 3 and 4 appearing in brackets in FIG. 2 represent the ink drop count, or the number of ink drops associated with a particular level of dye loading. This combination of drop count and dye loading will in turn yield a specific gray scale level which is assigned to the pixel values actually read by the scanner 10 in FIG. 1. This assigned gray scale value is the closest gray scale number in the gray table in FIG. 2 to the actually read pixel values.

The blank areas of the table shown in FIG. 2 to which no drop count numbers are assigned are all (0, 0, 0). Therefore, the 3 digit drop count gray scale numbers shown in FIG. 2 are the only numbers in the 16-level gray table having one or more positive digits of either a 1, 2, 3 or 4 value corresponding to available drop counts within the 16 gray scale levels.

There are actually 256 levels in a complete gray scale used in practicing this invention. This number 256 is a convenient even number in the digital signal processing art and has far more resolution in gray scale than is normally needed. The human eye can resolve only about 50 gray levels between maximum white and maximum black. Also, the number 256 is a typical level resolution number for the scanner 10. Therefore, each of the 16 levels in FIG. 2 represents one sixteenth of the total 256 level gray scale. Thus, in level one (1) of the table in FIG. 2, the (0, 0, 1) notation indicates that the only available drop count and dye loading for achieving a level one of the gray table is a single drop or drop count having a low (L) or one weighted dye loading. Similarly, a level two of gray scale may be achieved by using either one drop of a medium (M) dye loading (0, 1, 0) or two drops of a low dye loading (0, 0, 2), as indicated in level two of the table, and so on down the table. However, it will be understood by those skilled in the art that many other gray levels may be used instead of the 16 levels indicated in FIG. 2.

For example, a 32 level gray table is especially well suited for use in practicing the present invention and would be used in combination with a 8:3:1 reflectance ratio in an arrangement shown in FIG. 2B. It will be observed in FIG. 2A that level 15 of the table has no exact available gray scale number for achieving the exact level 15 or 15/16ths of the total 256 level gray scale. Level 15 can be achieved by using a level 14 in combination with an error diffusion. The selection of the above gray scale numbers in FIGS. 2A and 2B which define and control the available drop counts and dye loadings will become better understood in the following descriptions of FIGS. 3-4.

Referring now to FIGS. 3A through 3D, the data processing system shown in these figures provides a detailed explanation of the operation of the error diffusion and pixel assignment stage 16 in FIG. 1. This data processing system is comprised of a number of functional blocks which include therein descriptive legend to aid in the reader's understanding of the invention. These functional blocks are actually individual stages of a computer, and as such are sometimes alternatively referred to as "stages" or "test stages" in the case of performing a yes-no test on a particular piece of data. The test stages in this system are indicated by the diamond shaped functional blocks, whereas the other operational stages which perform a specific functional operation on the incoming data are rectangular in shape. However, for the ease of describing this data processing system and its two feedback loops, each of the functional blocks or stages therein will be referred to hereinafter as "steps" in order to generically indicate the functional steps performed on the data being operated on in each of the electronic stages.

As indicated at step 20, each of the black, cyan, magenta and yellow pixel values are read by the scanner 10 in FIG. 1 and converted to C, Y, M and K digital data, each having a row and column, (i,j,) within the 256 level gray scale. As indicated at step 22, each of the black, cyan, magenta and yellow gray levels from step 20 are assigned their closest corresponding gray scale number within the gray table of FIG. 2, and the difference between the actual and assigned gray levels are diffused by error diffusion at step 24 into the surrounding pixels as previously described.

Figure 3A:
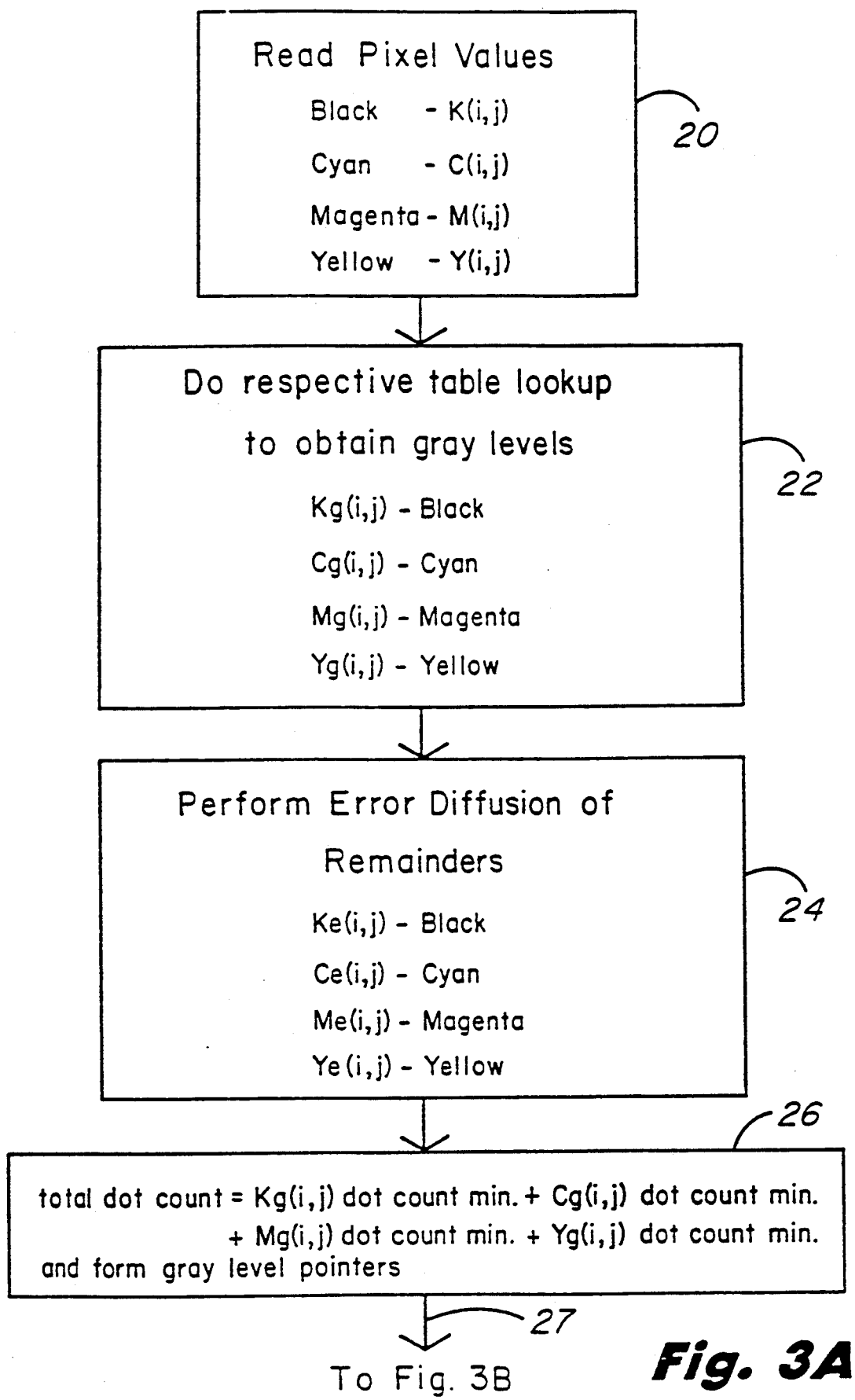
FIGS. 3A and 3B are respectively the upper and lower portions of a schematic flow chart depicting the data processing methodology and structure used for controlling the operation of the error diffusion and pixel assignment gray scaling stage in FIG. 1.
Figure 3B:
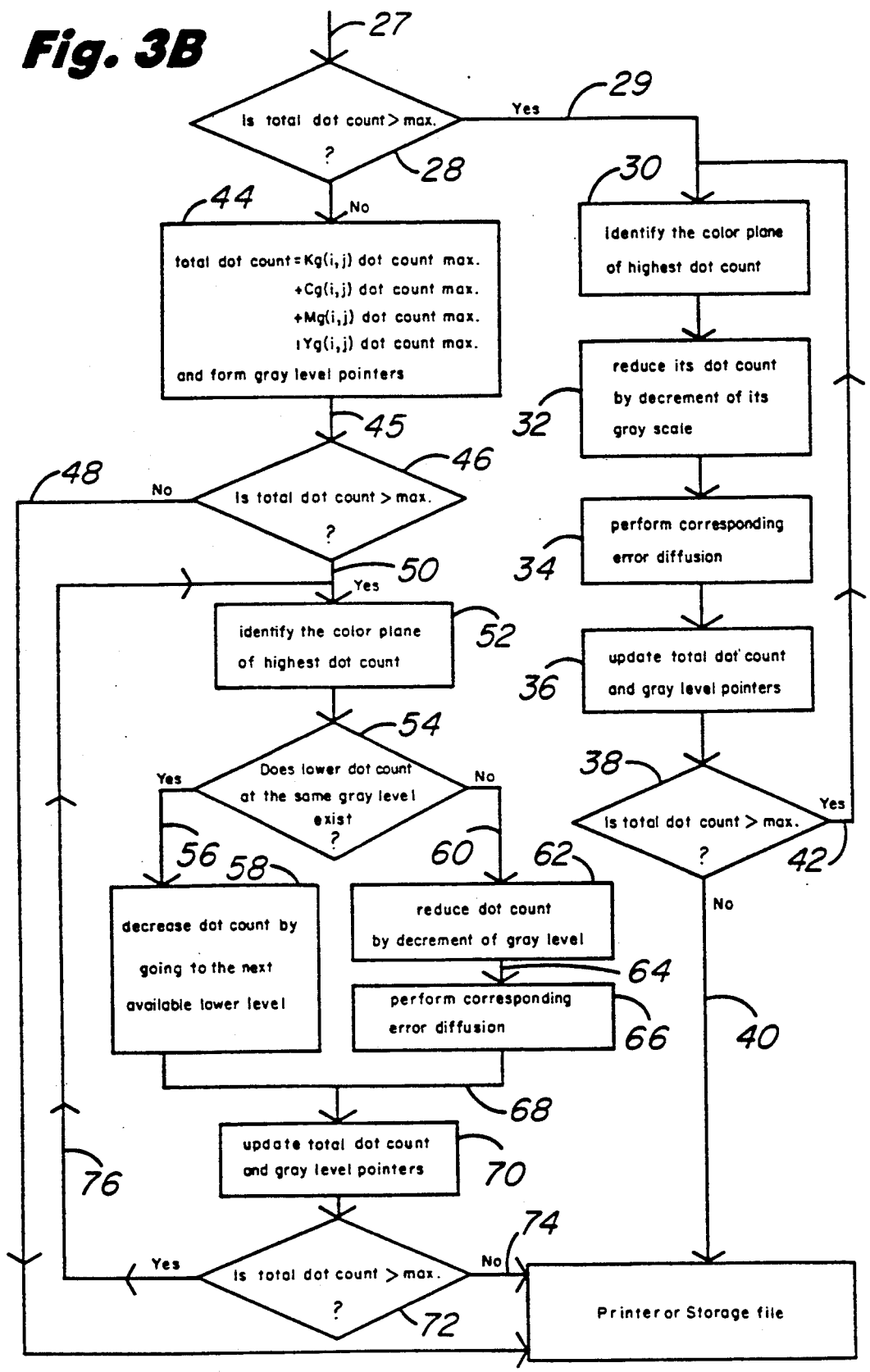

At step 26, a total drop count is calculated for the black, cyan, magenta and yellow minimum available drop count numbers within the 16 level gray table of FIG. 2, and this drop count minimum is compared at step 28 in FIG. 3B (also shown in FIGS. 3C and 3D) to a predetermined maximum allowable drop count, $V_{max}$, as previously defined. If the total drop count minimum at step 28 is greater than $V_{max}$, then the color plane of the highest drop count, $D_{max1}$, of the group of drop counts for the colors C, Y, M and K is identified at step 30, reduced (decremented) in drop count at step 32 to its next lower value in the gray scale, and the difference between the newly assigned gray scale number and the actually read gray scale number is used to produce a corresponding error diffusion at step 34. Thereafter, the new total drop count is updated at step 36 and then again compared to $V_{max}$ at step 38. If the total drop count at step 38 is now less than $V_{max}$, then the correct corresponding digital data is generated on line 40 and is used to drive a color ink jet printer 18 in FIG. 1. If the total drop count at step 38 is still greater than $V_{max}$, then a feedback signal generated in the feedback loop 42 is utilized to then again identify the color plane of the next existing highest C, Y, M, or K drop count at step 30 and the process in the loop 30, 32, 34, 36, 38 and 42 repeats itself.

If the total drop count at step 28 is now less than $V_{max}$, then the step 44 is operative to generate a total drop count sum of all the maximum drop count numbers in the gray table of FIG. 2 for each of the K, C, M and Y assigned pixel values. This sum of the total K, C, M and Y drop count maximums is then compared at step 46 to $V_{max}$. If this total drop count sum is less than $V_{max}$, a signal on line 48 is generated and is used to drive a color printer and no further signal processing is necessary. If, however, the total maximum drop count sum at step 46 is now greater than $V_{max}$, then the output signal on line 50 from step 46 is applied to step 52 and therein used to identify the color plane of the next highest individual drop count, $D_{max2}$, of each of the previously summed K, C, M and Y drop count maximums.

If there is then existing a lower drop count gray scale number at the same gray level within the table of FIG. 2 as determined in step 54, then a signal on line 56 from step 54 is generated and is used to decrement the drop count in step 58 by going to the next lower drop count maximum number within the same level of the gray table in FIG. 2. If, however, no lower drop count number exists for the same level of gray scale as determined in step 54, then a signal generated on line 60 from step 58 is applied to the step 62 where it is used to reduce the drop count number by decrementing the level of the gray table in step 62 to its next lowest gray level wherein a new drop count maximum number is selected. Then, an output signal on line 64 is applied to the step 66 where an error diffusion is performed to generate an error diffusion signal of line 68. The signal on line 68 is applied to the next step 70 and then fed to an output comparator 72. Here in the comparator 70 the updated total drop count number is again compared to $V_{max}$ to insure that the newly updated drop count number does not now still exceed $V_{max}$. If $V_{max}$ is not exceeded, a signal on line 74 is generated to drive the color printer. However, if the total drop count in step 70 still exceeds $V_{max}$, then a feedback signal on line 76 is returned via line 50 to the input of step 52 to again identify the color plane of the then existing next highest drop count for each of the group of K, C, M and Y maximum drop count gray scale numbers.

The following code in TABLE I is referred to in the image processing art as a "pseudo code" and is a statement of all of the various steps described above with reference to FIGS. 3A through 3D.

TABLE I

```
for all rows (j)
    for all columns (i)
    {
            read pixel values
            {
                    black k(i,j)
                    cyan c(i,j)
                    magenta m(i,j)
                    yellow y(i,j)
            }
            threshold the pixel values to their nearest gray level entry
                    table values such that:
            {
                    k(i,j) = kg(i,j) + ke(i,j)
                    c(i,j) = cg(i,j) + ce(i,j)
                    m(i,j) = mg(i,j) + me(i,j)
                    y(i,j) = yg(i,j) + ye(i,j)
                            where
                                    kg,cg,mg and yg are the available grey
                                    level table entry values of black,
                                    cyan, magenta and yellow respectively.
                                    ke,ce,me and ye are the error difference
                                    between actual pixel values and available
                                    grey level table values of black, cyan,
                                    magenta and yellow respectively, all these
                                    values must be positive.
            }
    drop count assignment base on maximum allowable ink (MAX)
    {
            if((kg(i,j).count_min + cg(i,j).count_min +
               mg(i,j).count_min + yg(i,j).count_min) > MAX)
                    do
                    {
                            assign: kg_count = kg(i,j).count_min;
                                    cg_count = cg(i,j).count_min;
                                    mg_count = mg(i,j).count_min;
                                    yg_count = yg(i,j).count_min;
                            identify the maximum of the set
                            (kg_count,cg_count,mg_count);
                            decrement the max value to its next
                            lower gray level table entry;
                            update gray level and count assignment;
                            do the correspondent error diffusion
                            to the neighboring pixels;
                    } while ((kg_count + cg_count + mg_count +
                            yg_count) > MAX)
    else
            if(kg(i,j).count_max + cg(i,j).count_max +
               mg(i,j).count_max + yg(i,j).count_max) > MAX)
                    do
                    {
                    assign: kg_count = kg(i,j).count_max;
                            cg_count = cg(i,j).count_max;
                            mg_count = mg(i,j).count_max;
                            yg_count = yg(i,j).count_max;
                    identify the maximum of the set
                    (kg_count,cg_count,mg_count);
                    decrement the max value to its next lower table
                    entry for the same gray level; if next entry is
                    not available, then decrement to the next lower
                    grey level and perform the corresponding error
                    diffusion;
                    update count assignment;
                    }while ((kg count + cg count + mg count +
                    yg count) > MAX)
            else
                    {
                            assign: kg_count = kg(i,j).count_max;
                                    cg_count = cg(i,j).count_max;
                                    mg_count = mg(i,j).count_max;
                                    yg_count = yg(i,j).count_max;
                    }
    }
}
```

An example of the above minimum and maximum C, Y, M and K drop counting and initial gray scale assignment is as follows: Assume that the read pixel values on the 256 level gray scale are K=20, C=50, M=35 and Y=0. Converting these values to the 16 gray scale will yield K=1 plus a remainder of 4, C=3 plus a remainder of 2, M=2 plus a remainder of 3, and Y=0. The above remainders are diffused via error diffusion into the surrounding pixels and using the well known Floyd and Steinberg algorithm. This error diffusion is made into pixels surrounding the particular chosen pixel within the above gray levels of 1, 3 and 2. From the table in FIG. 2, the drop count minimum for the above 1, 3, 2 and 0 levels of gray scale are $Kg_{min}=1$, $Cy_{min}=2$, $Mg_{min}=1$ and $Yg_{min}=0$ or a total minimum drop count of 4. The drop count maximum for these same levels of gray scale are $Kg_{max}=1$, $Cg_{max}=3$, $Mg_{max}=2$ and $Yg_{max}=0$, or a total maximum drop count of 6. Thus, if the maximum allowable drop count for each 2×2 super pixel is 8 drops, then the minimum (4) and maximum (6) drop count numbers given above will both be less than $V_{max}$ and a measurement of the total maximum drop count in step 46 of FIG. 3B will in turn generate an output signal on line 48 for directly controlling the color printer 18.

In another example of C, Y, M and K drop counting, assume that K=70, C=75, M=35 and Y=0. Converting these values to the 16 level gray scale will yield Kg=4 with a remainder Ke=6; Cg=4 with a remainder Ke=11; Mg=2 with a remainder Me=3; and Yg=0 with a remainder Ye=0. From the table in FIG. 2, the drop count minimum for the above $Kg_{min}$, $Cg_{min}$, $Mg_{min}$ and $Yg_{min}$ values is $1+1+1+0=3$, whereas the drop count maximum for the above $Kg_{max}$, $Cg_{max}$, $Mg_{max}$ and $Yg_{max}$ values is $4+4+2+0=10$. Thus, if $V_{max}=8$, the drop count minimum output signal from step 26 is not greater than $V_{max}$, so that no drop count minimum output signal is applied from step 28 to step 30, and step 44 is now activated. However, since the drop count maximum of 10 exceeds a $V_{max}$ of 8, the now activated step 44 begins a maximum drop counting function as previously described above with reference to FIG. 3B. This operation in turn will activate the test step 46 and ask step 46 if a drop count of 10 is greater than a $V_{max}$ of 8. Since this answer is "yes", then step 52 is activated to identify the color plane of the highest drop count in this gray scale reading which is K=4, or the input data which is applied to step 54. Since a lower drop count does exist at the same gray scale level as the level for K=4, and this lower drop count is K=3 as indicated in the level 4, ¾ column in FIG. 2A, then a "yes" signal is generated on line 56 and is applied to step 58 which decrements the drop count to K=3. Step 58 reduces or decrements the new total drop count sum to 9 instead of 10, and the updating of the new drop count sum is performed in step 70.

Now, is the new drop count sum of 9 still greater than a $V_{max}$ of 8? The answer is "yes" as is indicated in step 72, and thus a feedback signal on line 76 is applied to step 52 to again identify the color plane of the next highest drop count. As indicated in the numbers of this example, the answer is C=4 and this information is applied to step 54 where C=4 is used to determine if a lower drop count for C or cyan exists at the same gray level in FIG. 2A as the level for C=4. Since the answer is "yes", the signal generated on line 56 is applied again to step 58 where C=4 is decremented to C=3 and then applied to step 70. In step 70 a new total drop count sum of 8 is generated and is applied to step 72 for receiving another new drop count comparison.

Since the new drop count total of 8 is not greater than a $V_{max}$ of 8, a "no" signal is generated on line 74 and is applied to either a color printer 18 in real time or stored in a printer storage file for subsequent use.

In yet a third example of C, Y, M and K drop counting, assume that the read pixel values are as follows: K=85, C=85, M=85, Y=0. Converting these values to the 16 level gray scale will yield Kg=5+Ke=5; Cg=5+Ce=5; Mg=5+Me=5; and Yg=0 and Ye=0. From the table in FIG. 2, the drop count minimum for $Kg_{min}$, $Cg_{min}$, $Mg_{min}$, and $Yg_{min}$, respectively =2+2+2+0=6, and the drop count maximum for $Kg_{max}$, $Cg_{max}$, $Mg_{max}$, and $Yg_{max}$, respectively =3+3+3+0=9. Assume further for this particular example that $V_{max}=5$, so that the drop count minimum sum is greater than $V_{max}$ and a "yes" output signal is generated on line 29 and applied to step 30 to thereby activate the subsequent steps 32, 34, 36, 38, and feedback loop 42 as previously described. Here in this loop containing steps 30, 32, 34, 36, 38 and feedback line 42, the drop count minimum selection from the gray table of FIG. 2 will be decremented as previously described until a "no" output signal is generated on the output line 40 from the yes/no test step 38.

When using a multidrop color imaging system such as the one described in the above U.S. Pat No. 4,680,645 issued to Dispoto et al which fires drops on top of drops in a single pixel, the drop count and dye loading selection process is complete at this point. However, when the drops are fired into super pixels such as a 2×2 super pixel, the fired drops must now be assigned to a desired pixel quadrant as they are sequentially fired into the super pixel. This operation is described below with reference to FIG. 4.

FIG. 4 shows a matrix of 12 color planes of 2×2 super pixels including three rows of high, medium, and low dye loadings versus four columns of black, cyan, magenta and yellow colors. Although these twelve super pixels are shown as being physically separated in FIG. 4, it will be understood by those skilled in the art that these super pixels are all superimposed on one another in the print scanning operation described below and thereby actually occupy the same space on the print media. Accordingly, the physical separation of these twelve super pixels in FIG. 4 is made for purposes of explanation only.

These super pixels are sequentially addressed from left to right and starting at the top or H row and then proceeding vertically down through the M & L rows in the normal manner of scanning a printed surface area. These 12 super pixels represent the timed sequence of successive dot printing in order to achieve a minimum of color contrast on a printed page. The black, cyan, magenta and yellow colors are arbitrarily assigned designated digits of 0, 1, 2 and 3, respectively, whereas the high, medium and low levels of dye loading are assigned weighted units of 0, 1 and 2 respectively. Thus, when one is printing sequentially from left to right and then scanning vertically down the matrix in FIG. 4, the individually assigned pixels for receiving successive drops of ink are continuously changed in a clockwise rotation in moving from pixel to pixel. In this manner, each successively printed pixel receives in succession (and in accordance with its assigned gray scale drop count number) the colors C, Y, M and black cycled in order through the high, medium and low dye loadings.

The firing sequence of the color printhead of the ink jet printer under control is continuously controlled to print the next adjacent quadrant of each super pixel as each super pixel is printed in succession. This clockwise (or counter clockwise) clocking action continues to rotate the location of each next printed individual pixel to the next super pixel quadrant, so that each successively printed drop of ink is rotated to the next adjacent quadrant of each super pixel until all of the scanned super 2×2 pixels are printed in succession. In this manner, the ink is distributed over the entire super pixel matrix in FIG. 4 in a highly uniform manner, and this operation minimizes the ink volume per unit of printed area ratio for an ink jet printing operation. This action in turn simultaneously minimizes both paper cockleing and color contrast or grainyness of the printed hardcopy output from an ink jet printer.

Figure 3C:
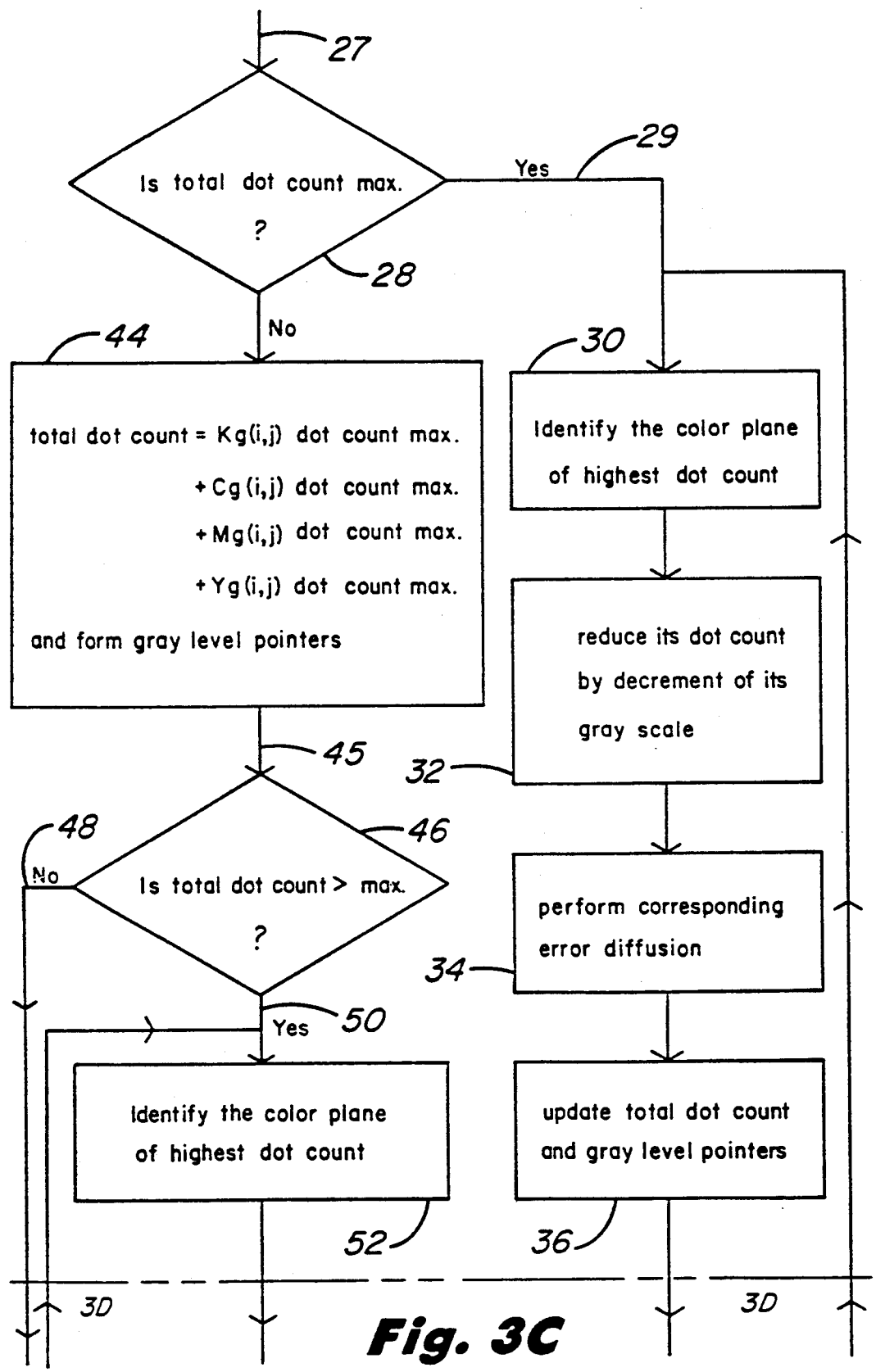
FIGS. 3C and 3D are enlargements of FIG. 3B which have been made in order to enlarge the size of legend used in FIG. 3B.
Figure 3D:
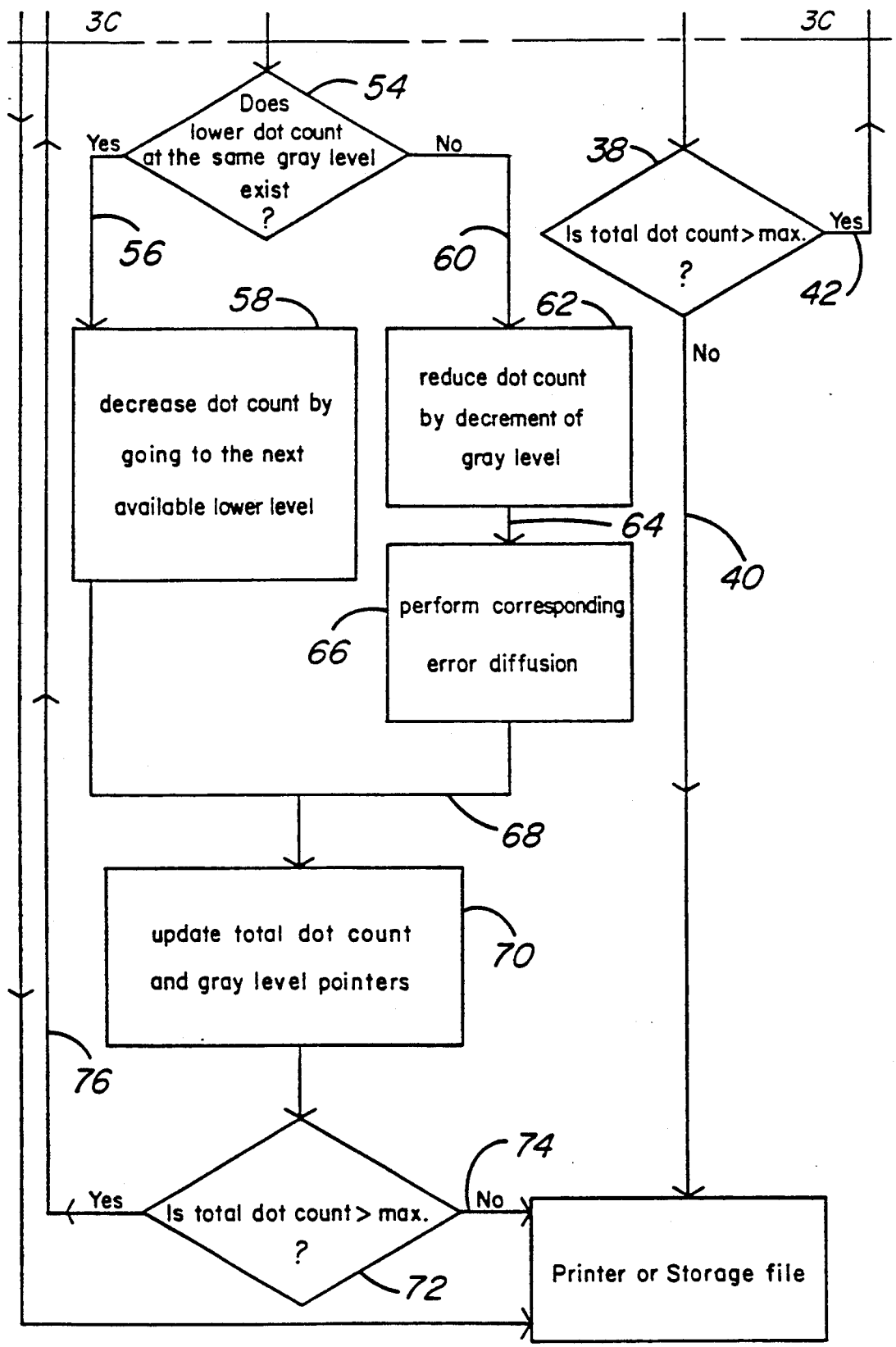

The above operation will be better understood with reference to an example of the finally adjusted gray scale information which is applied to the color printer or printer storage file 18 from one of the input lines 40, 48 or 74 connected thereto as shown in FIGS. 3B, 3C, and 3D. As shown in the example of FIG. 4, assume that the "High" column of K, C, M and Y data is 2, 2, 1, 0, that the "Medium" column of K, C, M, and Y data is 2, 2, 0, 1 and that the "Low" column of K, C, M, Y data is 0, 0, 2, 0. Using this gray scale K, C, M and Y information, the pixel rotational and scanning operation will proceed as follows: The K=2 in the "High" dye loading column will eject drops into quadrants 76 and 78 of the super pixel 80. Then, rotating clockwise, the C=2 "High" dye loading will eject drops in the next clockwise adjacent quadrants 82 and 84 of the next super pixel 86. For M=1 in the "High" column, a drop is ejected in adjacent quadrant 88 of the next adjacent super pixel 90. Then, for Y=0 the next super pixel 92 is skipped.

Next the "Medium" dye loading column is addressed and K=2 therein puts drops in quadrants 94 and 96 in super pixel 98; C=2 puts drops in the next adjacent clockwise quadrants 100 and 102 of the next super pixel 104; M=0 causes the next super pixel 106 to be skipped; and Y=1 then puts a drop in quadrant 108 of super pixel 110.

Continuing, a "Low" column K=0 and C=0 causes super pixels 112 and 114 to be skipped, respectively; a low M=2 puts drops in the next adjacent clockwise quadrants 116 and 118 of the next super pixel 120 and a low Y=0 causes the last pixel 122 of the matrix to be skipped. Then the above described operation is repeated for the next received gray scale data applied to the printer 18.

The above pixel selection process described with reference to FIG. 4 is defined in code form by the following pseudo code shown in the table below for the 2×2 super pixel assignment-defining data structure.

TABLE II

Pseudo code for 2×2 Super-pixel assignment
defining data structure
d[plane][level]:
```
/* plane : 0 = > black    */
/*         1 = > cyan     */
/*         2 = > magenta  */
/*         3 = > yellow   */
/* level : 0 = > high     */
/*         1 = > medium   */
```

TABLE II-continued

```
/* 2 = > low          */
super_pixel[plane][level][location];
       /* plane : defined as above    */
       /* level : defined as above    */
       /* location : 0 = > top left   */
       /* 1 = > top right             */
       /* 2 = > bottom right          */
       /* 3 = > bottom left           */
kount = 0;
for j = 0 to 2              /* gray level */
    for i = 0 to 3          /* color plane */
        if ( d[i][j] > 0 )
        {
        for k = 1 to d[i][j]
        {location = kount mod 4   ;
        super_pixel[i][j][location] = 1;  /* 1 = > presence other = > absense */
        }
}
```

The scheme of dots assignment to a 2×2 super-pixel is to assign the dots counts in the sequence of their highest gray level plane from black, cyan, magenta to yellow. This scheme is then repeated as described in the example given above for medium and low gray level.

Various modifications may be made in the above described embodiment without departing from the scope of this invention. As an example, a different dye loading ratio of 8:3:1 may be used with a 32 level gray scale and with a 2×2 super pixel in accordance with the above teachings. In addition, this invention may be used with different size drop volumes or with multi-drop formatting where the print area is only a single pixel. However, in the multi-drop printing process, higher print frequencies are required as compared to those required by the present invention. Also, the present invention may be used with other types of ink jet printers such as thermal transfer or piezoelectric ink jet printers.

The present invention may also be modified by one skilled in the art to make it adaptable for use with different ink drop volumes (e.g. 160, 80 and 40 picoliters) such as those described in commonly assigned U.S. Pat. No. 4,746,935 issued to Ross R. Allen. Using a suitable modification of the data processing methodology shown in FIGS. 3A, 3B, 3C, and 3D it is possible to accommodate the used of multiple drop sizes with or without the use of multiple gray levels.

In priority of selecting the highest drop count from the (C, Y, M, K) colors, there may be an advantage to modify this set to only (C, M, Y) colors only and to leave the black or K plane of information intact. This is because the black plane contains most of the resolution information, and this is especially true for the case of 100% UCR where the error diffusion of the color plane will only slightly alter the chromaticity of the printed image. Additionally, the visual perception is more sensitive to resolution than it is to color information. As a practical matter, the yellow gray scale is of least importance, so from both a hardware and a software standpoint, a single dye level of yellow would be acceptable.

Figure 5A:
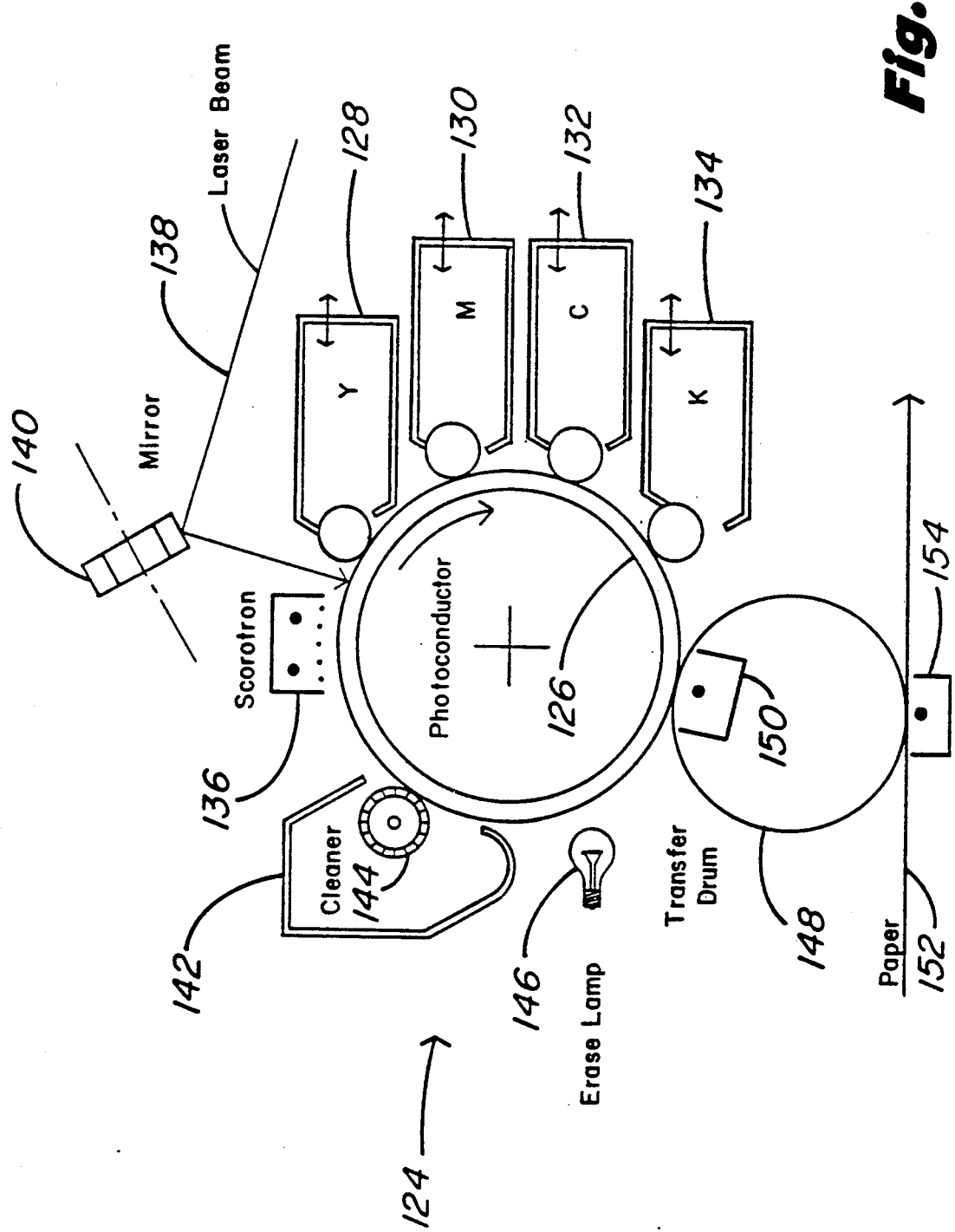
FIG. 5A is a schematic view of a print engine of a color laser printer which may be used in practicing the electrophotography embodiment of the invention.

Referring now to FIG. 5A, there is shown in a schematic cross-section diagram a print engine 124 of a color laser printer and it includes a photoconductive drum member 126 positioned as shown adjacent to a plurality of primary color development units 128, 130, 132, and 134 for supplying the primary toner colors of yellow, magenta, cyan, and black, respectively to the drum 126. The print engine assembly in FIG. 5A further includes a scorotron charging unit 136 which is used to charge the photoconductor 126 in preparation to receive an image writing signal from a laser beam 138 supplied, for example, by a laser diode (not shown). This laser signal source is used to project a laser beam 138 first toward a spinning polygon mirror unit 140 and then directly onto the surface of the photoconductive drum 126 as indicated and understood by those skilled in the art of electrophotography.

Other conventional elements of the laser print engine 124 in FIG. 5A whose operation is described in more detail below includes a cleaning unit 142 having a rotational cleaning brush 144 therein and positioned as shown adjacent to the photoconductive drum 126 for cleaning the photoconductive drum 126 once each complete rotation thereof. The print engine 124 further includes an AC discharging unit or erase lamp 146 for discharging the photoconductive drum 126 once each write cycle, and also includes a transfer drum 148 for receiving the individual color images in series from the larger drum 126. This transfer drum 148 will typically include a dielectric belt thereon Which receives a charge from the transfer corona charging unit 150 and electrostatically pulls colored toners from the photoconductive drum 126 and transfers these colored toners in sequence to the print media 152 to thereby form a composite color image thereon.

The toner developers used in the present process for producing the cyan, magenta, yellow and black colors will normally be either the mono-component or two component type of colored toners. The mono-component toner has a magnetic core and is typically used for the cyan, magenta, and yellow colors and is cheaper than the older and better known two component toner which is normally used for the black unit 134. Two component toners will typically include a plastic color particle mixture combined with a magnetic particle element such as iron oxide which should not to be transferred to the paper if good transparency in the deposited two component toner is to be maintained. However, the ratio of plastic particle to magnetic particle components in this two component toner is also sometimes critical to maintaining good transparency of this two component toner. However, as will be discussed further below, the mono-component toner having a magnetic core material is not always a completely transparent toner and presents certain problems with respect to the formation of high quality multi-color images which are solved by the dot-next-to-dot (DND) formatting and printing process according to the present invention.

The print engine 124 in FIG. 5A is used to form a full color image on the media 152 and this is accomplished by the following sequence of steps: Initially, the scorotron charger 136 charges the photoconductive drum 126 to a voltage on the order of 900 volts and a latent image is written on the surface of the drum 126 with the laser beam 138. Then, one of the Y, M, C, and K colors units 128, 130, 132, and 134 is used to apply a colored toner to the surface of drum 126 to develop this one color of image which is then transferred to the transfer drum 148. The transfer corona charging unit 150 is used to help transfer the toner from the photoconductive drum 126 to the transfer drum 148 by electrostatically pulling the toner from the drum 126.

Next, an erase lamp 146 is used to erase any charge remaining on the drum 126 and discharge its surface, and the cleaner unit 142 is used to clean the surface of the photoconductive drum 126 and remove any toner remaining thereon in preparation for receipt of a second (M), third (C) and fourth (K) toner in sequence for the subsequent serial transfer of color images developed in these toners to the drum 148. After all four color planes are transferred onto the transfer drum 148, the composite color image is transferred to the paper or other suitable print media 152 with the help of another transfer corona charging unit 154. Here the individual Y, M, C, and K colors are superimposed upon one another to form a composite color image as is known in this art.

If preferred, electrophotographic print engines such as the laser print engine 124 in FIG. 5A may be operated by first combining the color images of cyan, yellow, magenta, and black directly on the photoconductive drum 126 and then developing the complete composite color image thereon before transferring this complete color image electrostatically to the transfer drum 148. However, using either of the above types of color image transfer processes in combination with dot-on-dot (DOD) formatting techniques of the prior art have the disadvantage that each process must charge, expose, develop, and transfer colors through a toner layer that has already been deposited on the photoconductive drum 126. This requirement in turn results in process complications in the development and image transferring process, ultimately resulting in a degradation in print quality of the hardcopy output from the print engine. These process complications arise in part because neither of the above dual described component or mono-component toners can always be relied upon to be completely transparent. As previously indicated, the dual component toner having the separate magnetic particles therein has more transparency than the mono-component toners; but even in the case of the dual component toner, good transparencies are not always completely assured and depend upon the criticality of the ratio of the two components therein as previously indicated.

In addition to the above process complications arising from the use of non-transparent toners in combination with dot-on-dot (DOD) color printing, the color mixing of the cyan, magenta and yellow dots on top of one another do not mix and blend satisfactorily when the partially transparent upper or covering dot shields or partially shields the lower or covered dot. For example, the mixing of a cyan dot on top of a yellow dot is intended to produce a green color of high quality. But if the covering cyan dot is only partially transparent, the intended green color will have a predominantly cyan shade to it. Similarly, the printing of a yellow dot on a cyan dot will produce a green color with a noticeable yellow shade if the covering yellow toner is only partially transparent.

The novel method according to the electrophotographic process embodiments of the present invention is designed to overcome the above problems related to a lack of complete transparencies in colored toners, and this new and improved method uses dot-next-to-dot (DND) formatting to accomplish this purpose. In one aspect or specie of this novel process, electrophotographic color printing is carried out by mixing the primary colors of C, Y, M, and K in a single plane and in dot-next-to-dot (DND) pixels within a plurality of super pixels to thereby produce a composite color image in which the sum of multiple colored dots printed in any super pixel is limited to the number of subdivided individual pixels therein. In this manner, dot-next-to-dot-always (DNDA) printing is assured, and there is never any dot-on-dot (DOD) color mixing and the above problems related to lack of toner transparencies.

In another aspect or specie of the present invention, either monochromatic or color gray scale printing may be achieved by forming dots electrophotographically in a dot-next-to-dot (DND) fashion in a plurality of super pixels as described above so that the maximum number of dots printed in each super pixel never exceeds the number of individual or subdivided pixels therein. In addition, the area of each printed dot is varied within each pixel area by controlling the dot size printed in each pixel in a manner which is related to a desired level of gray scale to be achieved in the printed image. The dot size may be controlled, for example, by controlling the pulse width or power of the laser beam (which translates into laser beam spot size) used within a color laser print engine of the type described above.

Figure 5B:
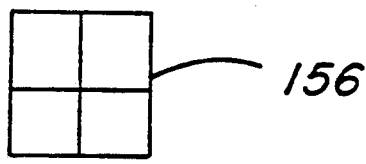
FIG. 5B super 2×2 pixels with five different levels (0–4) of gray level printed with dot-next-to-dot (DND) formatting.
Figure 5B:
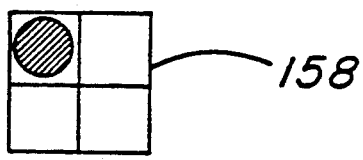
Figure 5B:
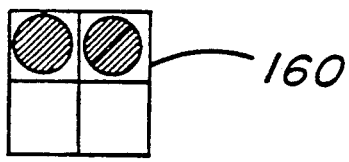
Figure 5B:
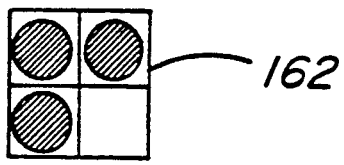
Figure 5B:
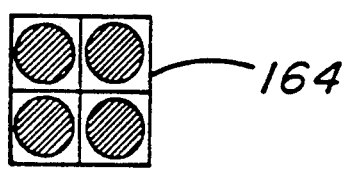

Referring now to FIG. 5B, there are shown five super pixels 156, 158, 160, 162, and 164 which correspond to the first five levels of gray scale, or the 0–4 gray scale levels for both monochromatic and color laser printing and using dot-next-to-dot-always (DNDA) formatting. This FIG. 5B represents the most generic case of the novel method combination claimed herein of dot-next-to-dot (DND) formatting used to produce a variable gray scale image in the field of electrophotography. The maximum dot loading or maximum number of dots allowed per super pixel, which is equivalent herein to $V_{max}$ of the previously described ink jet embodiments, is always equal to the number of subdivided pixels within a super pixel.

Figure 5C:
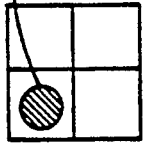
FIG. 5C shows four levels of a sixteen level gray table in order to illustrate the 1:2:4 dot loading used in laser printing.

Referring now to FIG. 5C, there are shown four levels of gray scale to illustrate a 1:2:4 dot loading in the field of electrophotography corresponding to the previously described 1:2:4 dye loading in the field of ink jet printing. Since the area of the printed dots is directly proportional to the square of the dot's radii, the 1:2:4 dot loadings illustrated in FIG. 5B are proportional to the relative dot diameters of diameter, $$\frac{1}{\sqrt{4}}$$

$$\frac{1}{\sqrt{2}}$$

diameter, and a full diameter or (1) dot diameter area of the electrophotographically printed dots. These square root notations are used herein to illustrate this proportionally between the electrophotographic dot areas and the ink jet dye loadings previously described in the thermal ink jet embodiment of the invention. Thus, a number 1 gray level in FIG. 5C may only be achieved by the use of $$\frac{1}{\sqrt{4}}$$

diameter printed dot 166 in one quadrant of the 2×2 super pixel. A second gray level or number 2 gray level in a given gray table may be achieved as indicated in the second row of two super pixels in FIG. 5C by printing either a $$\frac{1}{\sqrt{2}}$$

diameter dot 168 as indicated in the left hand 2×2 super pixel or by printing two $$\frac{1}{\sqrt{4}}$$

diameter dots 170 and 172 as indicated in the right hand super pixel of gray level 2.

Similarly, a number 3 gray level in FIG. 5C may be achieved as indicated in the left hand 2×2 super pixel by the printing of a $$\frac{1}{\sqrt{2}}$$

diameter dot 174 in combination with a $$\frac{1}{\sqrt{4}}$$

diameter dot 176, or by the printing of three $$\frac{1}{\sqrt{4}}$$

diameter dots 178, 180, and 182 as indicated in the right hand super pixel of gray level number 3.

Finally, a number 4 gray level in FIG. 5C may be achieved by printing either a full diameter dot 184 equivalent to a four dye loading in the left hand super pixel of gray level number 4 or by the printing of two $$\frac{1}{\sqrt{2}}$$

diameter dots 186 and 188 as indicated in the second from left super pixel gray level number 4 in FIG. 5C. Continuing, the number 4 dye loading equivalent in the field of electrophotography may also be achieved, by the printing of a $$\frac{1}{\sqrt{2}}$$

diameter dot 190 together with two $$\frac{1}{\sqrt{4}}$$

diameter dots 192 and 194 as indicated in the third from left super pixel in gray level number 4 in FIG. 5C or by the printing of four $$\frac{1}{\sqrt{4}}$$

diameter dots 196, 198, 200, and 202 as indicated in the far right hand 2×2 super pixel in gray level number 4.

Referring now to FIG. 5D, there is shown an example of variable dot loading in the field of color electrophotography which is equivalent to the variation in ink dye loading in color ink jet technology as previously described. FIG. 5D includes three rows and four columns of black, cyan, magenta, and yellow super pixels, with the pixel rows indicating large, medium, and small dot sizes for the array of super pixels to be printed in accordance with the example of color dot loadings indicated in the lower portion of FIG. 5D. Here is an example where the sum of the C, M, Y, and K primary colors is equal to, but does not exceed, the number 4, or the number of subdivided or individual pixels within each of the 2×2 super pixels.

Thus, in the example shown in FIG. 5D, a high dot loading or large diameter dot loading for cyan is accomplished by printing the full diameter cyan dot 204 in one subpixel in the cyan column of this figure. A medium dot loading for black is achieved by the printing of a $$\frac{1}{\sqrt{2}}$$

diameter black dot in the next clockwise-rotated pixel quadrant as indicated in the black column of FIG. 5D. Continuing in the clockwise rotational sequence, a medium magenta dot loading for the example given in FIG. 5D is achieved by the printing of the two magenta dots 208 and 210 as indicated in the central super pixel of the magenta column in this figure. Thus, if for example the dot loading in the K, C, M, and Y example given in FIG. 5D were to exceed the number 4, then any printing in excess of these four dots would have to be accomplished using the previously described process of error diffusion into surrounding super pixels (not shown) adjacent to the pixels shown in this figure.

Various modifications may be made in and to the above described embodiments without departing from the spirit and scope of this invention. For example, the various species of inventions recited in the method claims appended hereto are not limited to the particular apparatus and system embodiments described above and may be carried out using many other and various types of electrophotographic and ink jet printing apparatus may become commercially available from time to time in the future.

Additionally, the present invention is not limited to the above example of 4:2:1 dot loadings or the limited gray level examples given above and may be used with other dot loadings (e.g. 8:3:1) or with expanded levels of gray scale if desired. Accordingly, these and other like modifications within the skill of the art are clearly within the scope of the following appended claims.

We claim:

1. A method of gray scale printing wherein each dot of a plurality of dots of one or more colors is printed within a pixel of a plurality of pixels and in a controlled dot-next-to-dot (DND) ordered sequence to form a plurality of super pixels defined by a given number of said pixels, characterized in that said method includes the steps of:
   a. scanning an image to provide pixel information values of one or more colors within the image,
   b. providing a plurality of different gray scale entry level numbers representative of different available dot loadings within a corresponding plurality of different levels of a chosen gray table,
   c. establishing a predetermined maximum allowable dot loading for printing within a given super pixel area, and
   d. selecting for printing a dot loading per super pixel which corresponds to said pixel information and said gray scale entry numbers and which does not exceed said maximum allowable dot loading.

2. The method defined in claim 1 wherein said dot loading is achieved by varying the ink drop count and dye loading during ink jet printing.

3. The method defined in claim 2 wherein said ink drop count and dye loading is chosen for cyan, magenta, yellow, and black color planes.

4. The method defined in claim 1 wherein said selected dot loading is achieved by varying a dot area in each pixel during electrophotographic printing by printing dot-next-to-dot always (DNDA) within said super pixel to ensure that there is never any dot-on-dot color mixing within said super pixel.

5. The method defined in claim 4 wherein said selected dot loading is selectively achieved for the cyan, magenta, yellow, and black color planes.

6. The method defined in claim 5 wherein said electrophotographic printing is achieved by dot-next-to-dot laser printing in all of said color planes.

7. The method defined in claim 6 wherein said maximum allowable dot loading or maximum number of dots printed in any super pixel is equal to a number of individual pixels into which said super pixel is sub-divided.

8. A method of monochromatic or color printing which comprises the steps of:
   a. providing a plurality of gray level number groupings for each of a corresponding number of levels of a gray table,
   b. selecting for printing an ink colorant or ink colorants which each correspond in quantity to one of said plurality of gray level number groupings,
   c. printing said ink colorant or colorants in a predetermined, dot-next-to-dot (DND) ordered sequence within individual pixels of a plurality of super pixels to thereby define a printed image, and
   d. selecting for printing a dot loading per super pixel which does not exceed a maximum allowable dot loading.

9. The method defined in claim 8 wherein said printing within each of said pixels of said plurality of super pixels is controlled by ink jet printing with a drop count and dye loading values for ink ejected into each pixel corresponding to one or more numbers in each of said number groupings, whereby individual number groupings within each level of a gray table may be selected on the basis of and related to a print quality of a print medium upon which said image is printed.

10. The method defined in claim 9 wherein said drop count and dye loading values in each of said individual number groupings are printed for each primary color, cyan, magenta, yellow, and black.

11. The method defined in claim 10 wherein each drop count number is available in high, medium, and low dye loading.

12. The method defined in claim 11 wherein each of said ink jet drop counts are printed in an ordered sequence in dot-next-to-dot fashion in a plurality of super pixels, whereby the maximum number of ink drops, $V_{max}$, within a given super pixel can be controlled by data processing methodology in such a manner as to prevent paper cockleing and optimize print quality of the image being printed.

13. The method defined in claim 8 wherein said printing within each of said pixels of said plurality of super pixels is controlled by electrophotographic printing with an electrophotographic dot size in each of said pixels which is related to one or more numbers in each of said number groupings, and further by printing dot-next-to-dot always (DNDA) within said super pixels to ensure that there is never any dot-on-dot color mixing within said super pixels, whereby individual number groupings within each level of a gray table may be selected on the basis of a print quality of a print medium upon which said image is printed.

14. The method defined in claim 13 wherein said electrophotographic dot size in each of said pixels is printed for each primary color, cyan, magenta, yellow, and black.

15. The method defined in claim 14 wherein selected large, medium, and small diameter dot sizes which are controllable by a color electrophotographic printer are used to control the gray level number within each number grouping selected.

16. The method defined in claim 15 wherein the dot size is controlled for each printed color by controlling a size of a laser beam within a color laser printer.

17. A method of gray scale printing of dots of one or more colors within a plurality of super pixels in a controlled ordered sequence including the steps of using one or more levels of dot loading in each of said super pixels to achieve one or more values of gray level of a multiple level gray table, and using dot-next-to-dot always (DNDA) formatting so that a number of dots printed in each super pixel never exceeds a number of individual or subdivided pixels therein and that there is never any dot-on-dot color mixing within said super pixels.

18. The method defined in claim 17 wherein an electrophotographic dot size in each of said pixels is printed for each primary color, of cyan, magenta, yellow, and black.

19. The method defined in claim 18 wherein selected large, medium, and small diameter dot sizes controllable by a laser beam of a color electrophotographic printer are used to in turn control the gray level number for each of said primary colors.

20. A method for gray scale printing of one or more colors which comprises the steps of:
   a. providing a plurality of different gray scale entry level numbers representative of different available printed dot loadings defined by printed dot area sizes per printed pixel, and corresponding to a plurality of different levels of a chosen gray table.

b. selecting an available gray scale entry level number within a selected level of said gray table which does not exceed a predetermined maximum allowable dot loading.

c. utilizing said entry level number to control a dot area size selection for each printed pixel within a super pixel, d. limiting the number of dots printed in each super pixel to a number of individual or subdivided pixels therein, and e. printing with dot-next-to-dot always (DNDA) formatting within said super pixels to ensure that there is never any dot-on-dot color mixing within said super pixels.

21. A method for gray scale color printing which includes the steps of:

a. scanning an image to provide pixel information values of one or more colors within said image, b. providing a plurality of different gray scale entry level numbers representative of different available dot loadings within a corresponding plurality of different levels of a chosen gray table, c. establishing a predetermined maximum allowable dot loading for printing within a given super pixel area, and d. selecting for printing a dot loading per super pixel which does not exceed said maximum allowable dot loading.

22. The method defined in claim 21 wherein one or more colors are selected from the group of colors consisting of cyan, yellow, magenta, and black.

23. A method of electrophotographic color printing which includes mixing a plurality of colors in a single plane and in dot-next-to-dot (DND) pixels within a plurality of super pixels to produce a color image, and printing with dot-next-to-dot always (DNDA) formatting within said super pixels to ensure that there is never any dot-on-dot color mixing within said super pixels, whereby the sum of the multi-color dots printed in any super pixel is limited to a number of subdivided individual pixels therein, thereby assuring dot-next-to-dot always (DNDA) printing of said colors in a single plane.

24. The method defined in claim 23 which further includes varying an area of each printed color dot within each pixel of a super pixel in order to control a gray scale of a printed color image.

25. The method defined in claim 24 wherein said plurality of colors are selected from the group consisting of cyan, magenta, yellow, and black.

26. The method defined in claim 25 wherein each printed color is controlled by a selection of a gray table entry level number representative of one of several available entry level numbers corresponding to a plurality of different dot loadings for a corresponding plurality of differently printed super pixels.

* * * * *